United States Patent [19]

Chen

[11] Patent Number: 5,161,558

[45] Date of Patent: Nov. 10, 1992

[54] VIBRATING APPARATUS FOR CLEANING FLOATABLE AND LIGHT WEIGHT OBJECTS

[75] Inventor: Yi-Chen Chen, Taipei Hsien, Taiwan

[73] Assignee: Torch Corporation, Taipei, Taiwan

[21] Appl. No.: 705,990

[22] Filed: May 28, 1991

[51] Int. Cl.⁵ .................................................. B08B 3/10
[52] U.S. Cl. ...................................... 134/61; 134/111; 134/140; 134/148; 134/153; 134/163
[58] Field of Search .................. 134/61, 63, 111, 140, 134/145, 148, 151, 153, 157, 163, 164

[56] References Cited

U.S. PATENT DOCUMENTS

| | | | |
|---|---|---|---|
| 1,847,309 | 3/1932 | Schmidt | 134/153 X |
| 1,959,921 | 5/1934 | Lewis | 134/61 X |
| 2,214,981 | 9/1940 | Vissac | 134/153 X |
| 3,166,082 | 1/1965 | Arnold et al. | 134/153 X |
| 3,604,435 | 9/1971 | Day, Jr. et al. | 134/61 |
| 3,610,260 | 10/1971 | Kearney | 134/151 X |
| 4,962,777 | 10/1990 | Bell | 134/63 |

*Primary Examiner*—Philip R. Coe
*Attorney, Agent, or Firm*—Browdy and Neimark

[57] ABSTRACT

A vibrating type cleaning apparatus for floating objects utilizes a pair of motors to produce a thrust against the cleaning objects by way of resonance, which has a cleaning platform with a meshed plate placed thereon to support the objects to be washed. A detergent pipe system and a water pipe system formed on the top of the cleaning platform provide a plurality of spraying heads, thereby the cleaning objects are washed by detergent and clean water in sequence. Therefore, the combination effect of spraying downwardly by spraying heads and spraying upwardly caused by vibration of motors is suitable for washing the floating objects.

3 Claims, 5 Drawing Sheets

VIBRATING APPARATUS FOR CLEANING FLOATABLE AND LIGHT WEIGHT OBJECTS

FIELD OF THE INVENTION

The present invention is related to cleaning apparatus, particularly to the vibrating type cleaning apparatus for floating objects.

BACKGROUND OF THE INVENTION

Conventional cleaning apparatus, generally have a stirring member to continually stir water mixed with detergent and the objects to be washed.

These conventional both stirring type machines do not thoroughly clean light weight objects that float, such as plastic balls. This is due to the fact that the cleaning solution does not uniformly reach the part of the surface of the floating object above the cleaning bath.

SUMMARY OF THE INVENTION

Therefore, it is an object of the present invention to provide an alternative to the conventional bath stirring type machine by providing a cleaning apparatus which overcomes the disadvantages set forth about when cleaning light weight floatable objects.

It is still an object of the present invention to provide a cleaning apparatus also suitable for the cleaning of light weight objects, such as vegetables.

It is another object of the present invention to provide a cleaning apparatus having a cleaning platform vibrated by a pair of motors which clean by way of resonance while washing with detergent and water spraying.

Other objectives and advantages will be appreciated as the invention becomes better understood by reference to the following description when considered in connection with the accompanying drawings.

DETAILED DESCRIPTION OF THE PREFERRED EMBODIMENT

Figure 1:
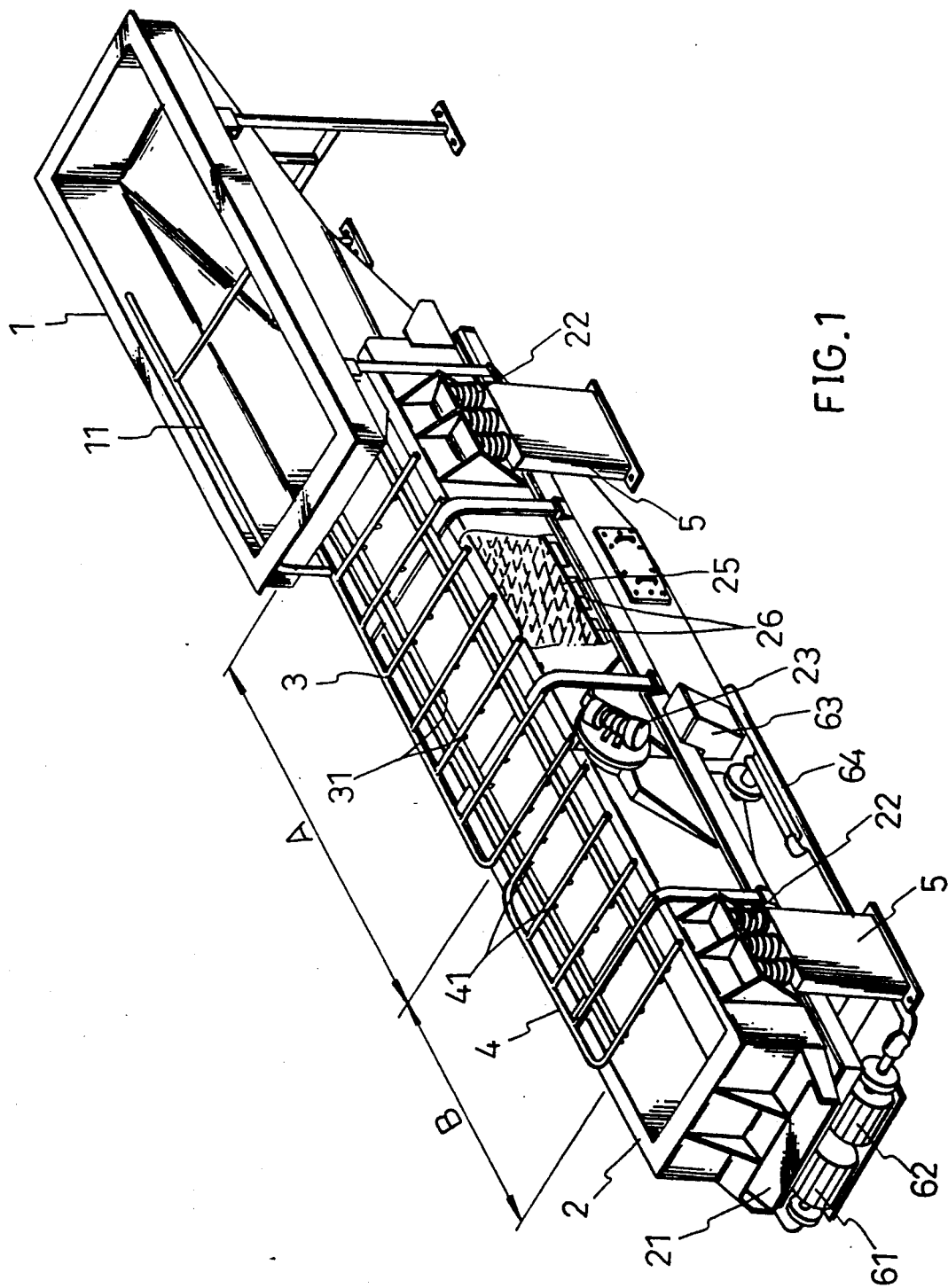
FIG. 1 is a perspective view according to the present invention.
Figure 2:
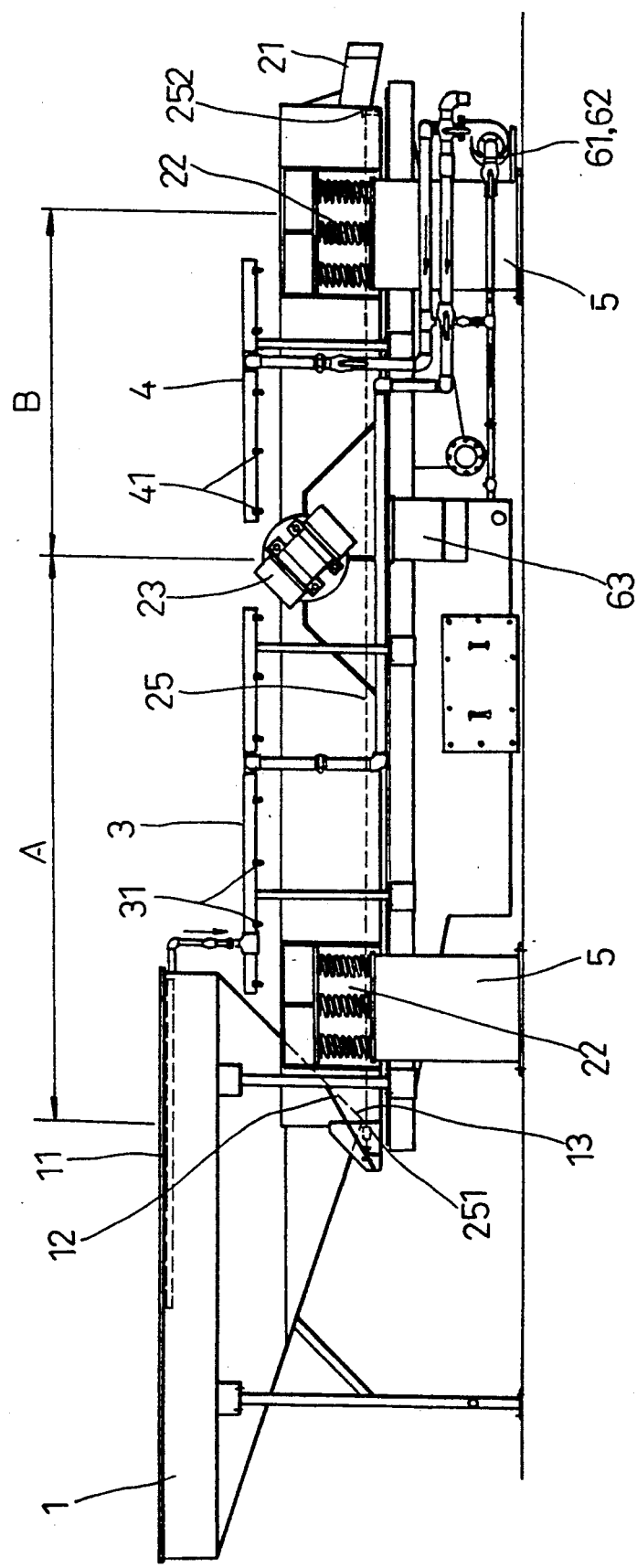
FIG. 2 is a side elevational view of the present invention.
Figure 3:
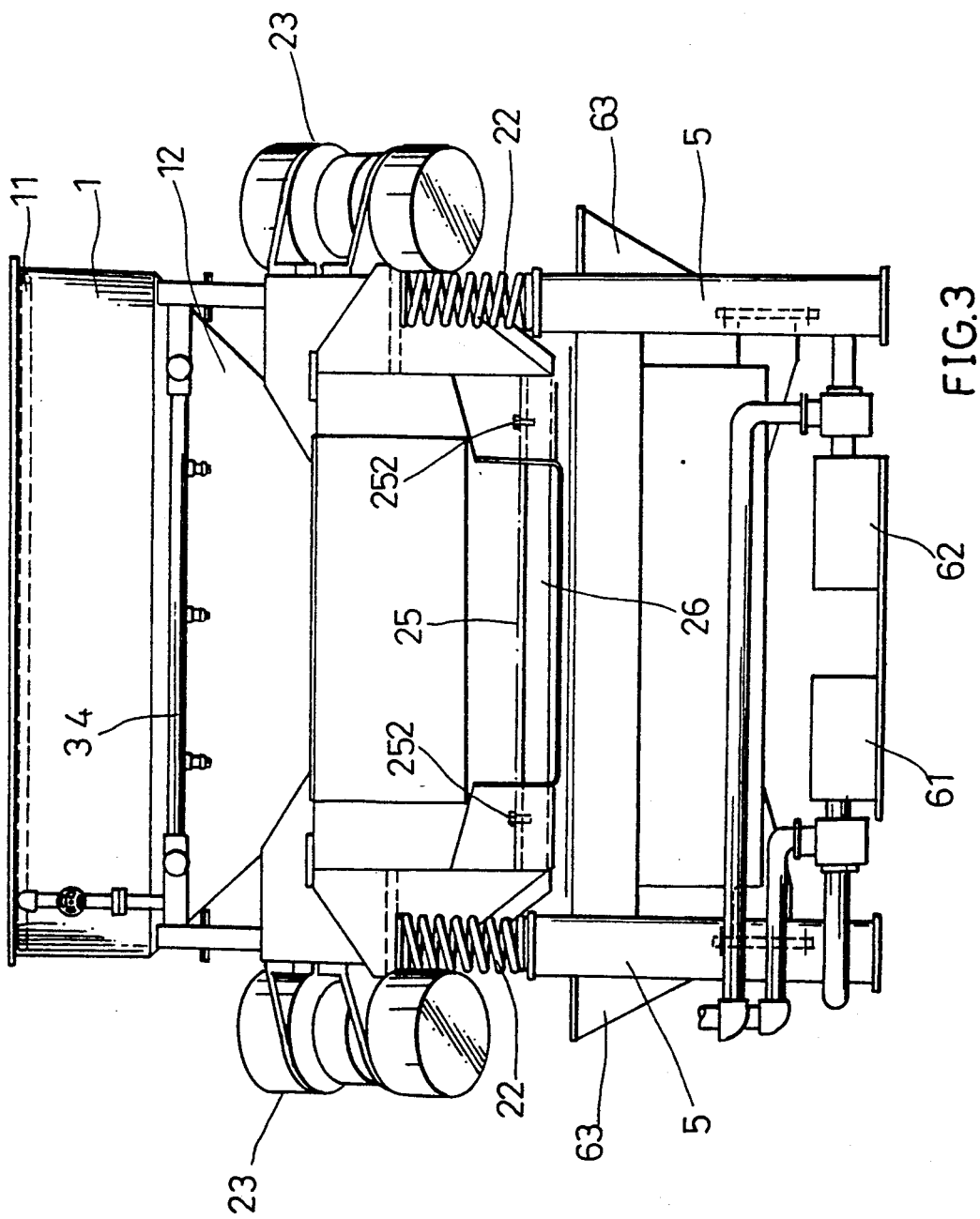
FIG. 3 is a front elevational view thereof.

With reference to FIGS. 1, 2, and 3, a vibrating type cleaning apparatus according to the present invention generally has an inlet funnel 1, a cleaning platform 2, a detergent pipe system 3 and clean water pipe system 4.

The inlet funnel 1 is positioned at one end of the cleaning apparatus to substantially receive objects (not shown) to be cleaned or washed, which has a water pipe 11 to wet the objects.

Turning now to FIG. 2, the inlet funnel 1 has side walls 12 defining an opening 13, from which the objects enter to the cleaning platform 2. The detergent pipe system 3 has a plurality of spraying heads 31 positioned on the front portion A of the top of the cleaning platform, while the spraying heads are grouped and arranged in a matrix in a way that can receive detergent from the detergent pipe system 3 and can evenly spray the detergent onto the objects passing through under portion A of the cleaning platform. The detergent is forced to circulate through a filter 63 by pump 61, so that the objects can be washed continuously by fresh filtered detergent.

In addition, the clean water pipe system 4 is placed on the rear portion B of the top of the cleaning platform 2, which has spraying heads 41 with configuration similar to the detergent spraying heads 31 to spray clean water circulated by pump 62. However, the water used to clean the objects, particularly to wash off detergent, is discarded through a drain outlet 64. The objects gone through detergent spraying and clean water spraying are collected at end opening 21 of the cleaning platform 2.

Mounted at the four corners of the cleaning platform 2 to resiliently support the cleaning platform are spring members 22, which are suspended by base 5 fixedly mounted on the ground. The cleaning platform 2 is generally U-shaped, which has portion A and B to substantially receive the detergent and clean water pipe system, respectively.

A meshed plate 25 is located in the cleaning platform 2, extended and secured thereto at both ends via a pair of fastening devices 251 and 252 to support the objects to be cleaned, whereas one of the fastening devices is resiliently connected. In the meantime, a plurality of plates 26 are arranged and positioned under the meshed plate 25 to collect the water and detergent. As the cleaning platform being driven to vibrate with respect to the ground by motors 23, the plates will force water and detergent upward to the washing objects. However the detergent collected at bottom of the cleaning platform, is filtered by filter 63 and pumped by pump 61 to recirculate, while the water is collected and released via the drain outlet 64.

Figure 4:
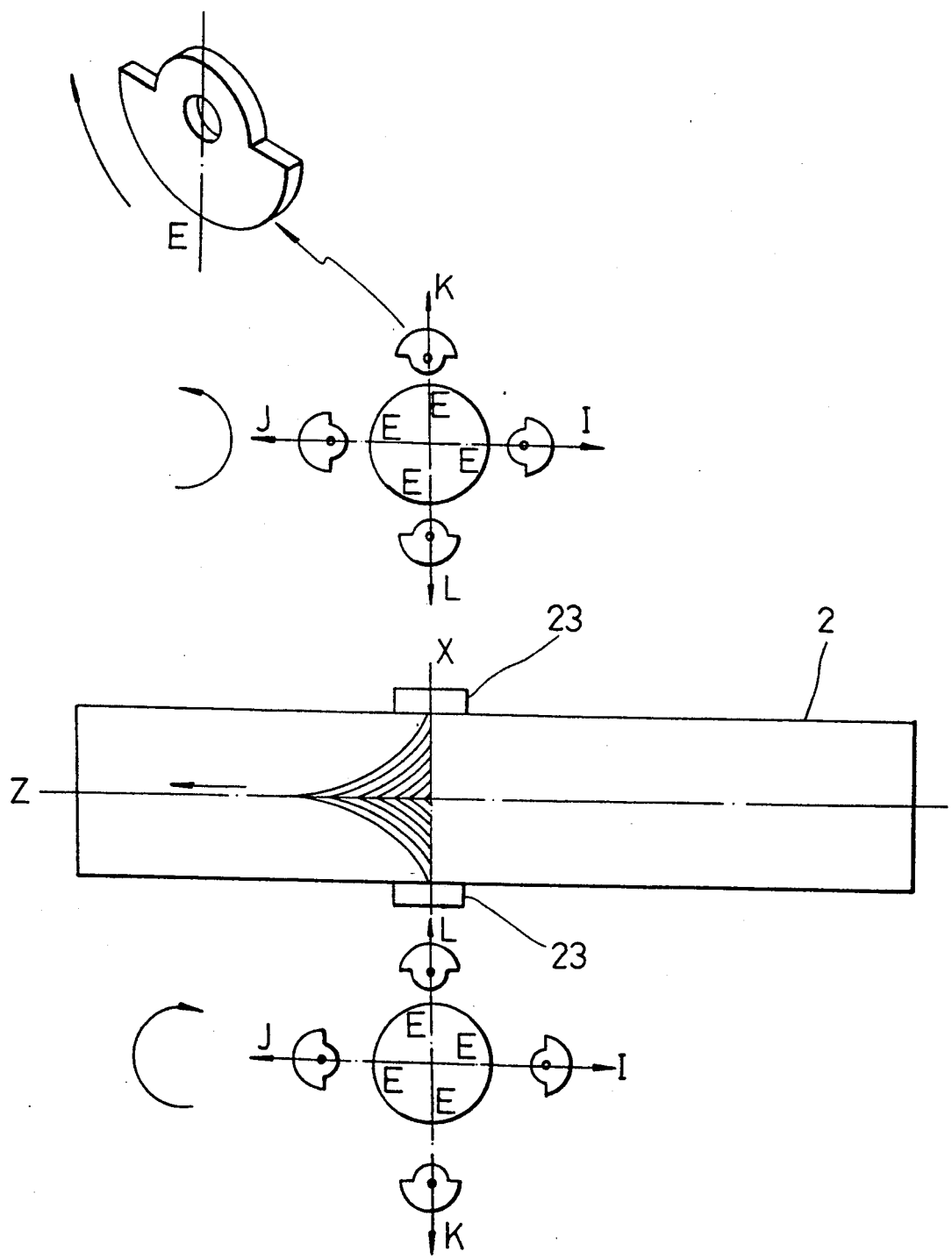
FIG. 4 shows vibration phenomenon utilized in the present invention.

Turning now to FIG. 4, a pair of motors 23 are positioned at two sides of the cleaning platform 2 on a common axis X.

Each motor 23 has a plurality of unbalanced pivoted weights which are rotated around the shaft of the motor in opposite directions, i.e. clockwise and counterclockwise. A schematic cross-section through each motor 23 showing the weights in each motor and an arrow indicating the direction of rotation of the motor is shown in FIG. 4. The line Z represents the distribution of forces exerted by the unbalanced pivoted weights during rotation of motors 23, E is the gravity center of unbalanced pivoted weights and I, J, K, and L are effective points of applied forces.

Figure 5:
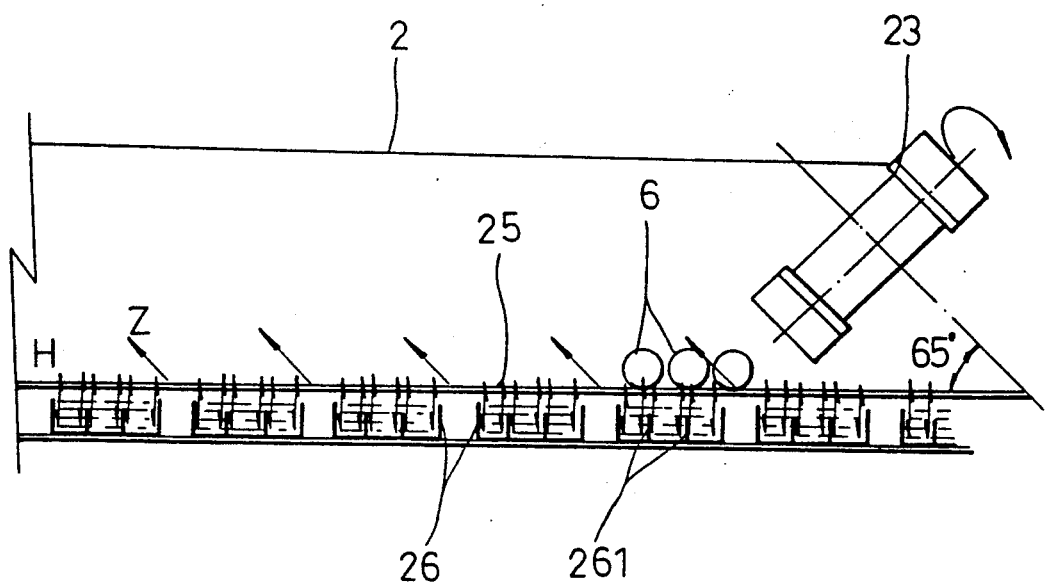
FIG. 5 and 6 illustrates the motion of a plastic balls being washed.

As shown in FIG. 5, motor 23 is mounted with its axis inclined to platform 2 to enhance the effect of the unbalanced weights during rotation. The objects to be washed are placed on and supported by the meshed plate, which undergoes vibrating forces exerted by the rotating unbalanced weights during operation of motors.

Figure 6:
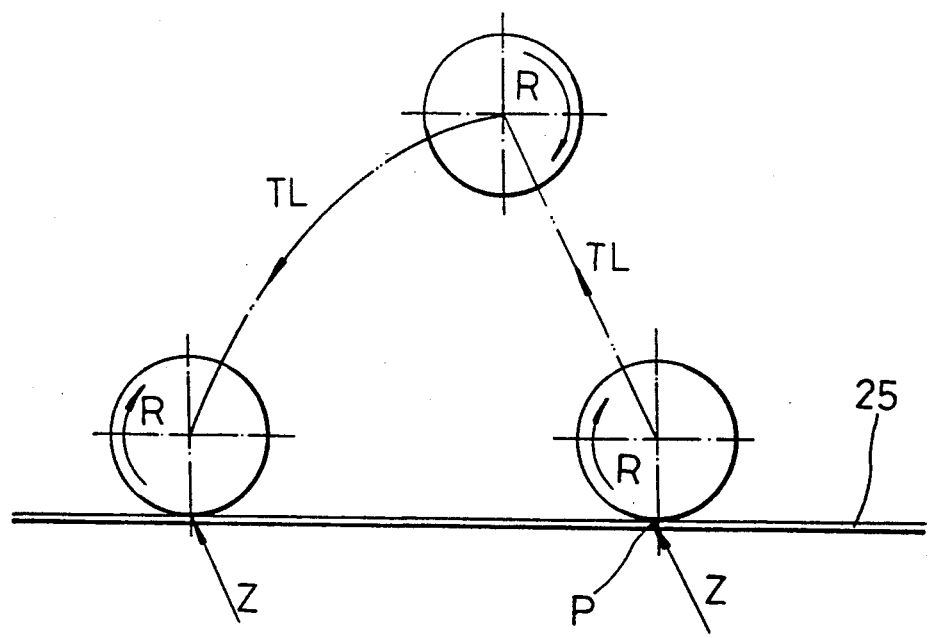

FIG. 6 shows one of the objects being forced to jump up along line TL parallel to direction Z and falling by its own weight. The direction R indicates the rotation of the object.

It is pointed out that a plurality of partitions 261 are placed in each plate 26, so as to facilitate the water jets excited by vibration.

Since obvious chances may be made in the specific embodiment of the invention described herein, such modification being within the spirit and scope of the invention claimed, it is indicated that all matter contained herein is intended as illustrative and not as limiting in scope.

What is claimed is:

1. A vibrating washing apparatus for cleaning floatable and light weight objects, comprising:

a cleaning platform having a U-shaped cross section;

an inlet funnel having a water pipe to wet the objects to be washed and an outlet to discharge the objects to be washed onto a first end of said cleaning platform;

a plurality of springs located at four corners of said cleaning platform to resiliently support said cleaning platform;

two ends of a meshed plate respectively secured by two fastening devices between said first end of said cleaning platform and a second end of said cleaning platform to support the objects to be washed discharged from said outlet of said inlet funnel;

a detergent pipe system having a plurality of first spray heads located after said outlet of said inlet funnel and over a first portion of said meshed plate;

a pump to force detergent into said system and out said first spray heads;

filter means for reconstituting detergent collected after spraying the objects to be washed;

a cleaning water pipe system, having a plurality of second spray heads located above a second portion of said meshed plate;

a pump to force water into said system and out said second spray heads;

drain outlet means for discharging the water after spraying the objects to be washed;

a motor positioned on each of two sides of said cleaning platform;

each said motor having a rotatable unbalanced set of weights;

said each said motor rotating in a direction opposite to the other said motor thereby creating vibration in said cleaning platform and moving the objects to be washed on said meshed plate in the direction of said vibration; and a plurality of plates, positioned below said meshed plate to substantially receive the detergent and water sprayed down from said first spray heads and second spray heads, and to force the water and detergent to move upwardly due to said vibration.

2. A vibrating washing apparatus as defined in claim 1, wherein one of said two fastening devices is resiliently connected.

3. A vibrating type cleaning apparatus as defined in claim 1, wherein each of said plurality of plates further comprises a plurality of partitions to facilitate the upward movement of water and detergent created by said vibration.

* * * * *